United States Patent [19]

Arnold

[11] Patent Number: 4,517,044

[45] Date of Patent: May 14, 1985

[54] DRY TRANSFER DECAL AND METHOD OF MANUFACTURE

[75] Inventor: Raymond M. Arnold, Chicago, Ill.

[73] Assignee: Advanced Graphic Technology, Chicago, Ill.

[21] Appl. No.: 546,521

[22] Filed: Oct. 28, 1983

Related U.S. Application Data

[62] Division of Ser. No. 322,596, Nov. 18, 1981, Pat. No. 4,421,816.

[51] Int. Cl.³ .......................... B44C 1/16; B32B 31/00; B32B 3/18; B41M 3/12

[52] U.S. Cl. .................................... 156/277; 156/240; 156/289; 156/275.5; 428/914; 428/202; 428/352

[58] Field of Search ............ 156/240, 277, 289, 307.7, 156/273.5, 273.3, 275.5, 275.7; 427/150, 151, 152; 428/200, 202, 914, 352, 201, 203, 204, 207, 211, 353, 354; 101/DIG. 3, DIG. 19

[56] References Cited

U.S. PATENT DOCUMENTS

| | | | |
|---|---|---|---|
| 3,212,913 | 10/1965 | Mackenzie | 428/206 |
| 3,896,249 | 7/1975 | Keeling et al. | 428/202 |
| 3,922,435 | 11/1975 | Asnes | 428/914 |
| 3,987,225 | 10/1976 | Reed et al. | 156/240 |
| 4,022,926 | 5/1977 | Keough et al. | 428/914 |
| 4,177,309 | 12/1979 | Shadbolt et al. | 428/195 |
| 4,308,310 | 12/1981 | Arnold et al. | 156/277 |
| 4,313,994 | 2/1982 | Kingston | 428/202 |

*Primary Examiner*—Edward Kimlin
*Assistant Examiner*—Louis Falasco
*Attorney, Agent, or Firm*—Allegretti, Newitt, Witcoff & McAndrews, Ltd.

[57] ABSTRACT

An improved decal and method of decal manufacture includes a base sheet of polyethylene (polymeric) type material with a urethane (polymeric) high solids content carrier layer in the shape of the decal printed thereon. The graphics for the decal are printed on the carrier layer and a high tack adhesive is then overprinted on the ink layers forming the completed decal. The decal is applied to a surface and the base sheet is separated from the applied decal.

3 Claims, 4 Drawing Figures

DRY TRANSFER DECAL AND METHOD OF MANUFACTURE

This is a divisional of application Ser. No. 322,596, filed Nov. 18, 1981 now U.S. Pat. No. 4,421,816.

BACKGROUND OF THE INVENTION

This invention relates to an improved dry transfer decal and a method of manufacture for such a decal.

There are many applications for a high strength, well protected, strongly adherent label. Such labels are traditionally made by printing inks onto a self-adhesive base film and then overlaminating the printed matter with a further layer of clear film to cover and protect the printed inks from abrasion and weathering. FIG. 1 illustrates such a label.

Traditional materials for the base film or substrate are transparent or pigmented vinyl or polyester, and various types of natural or synthetic papers. The appropriate substrate is chosen to give the desired properties of color, opacity, elasticity, tensile strength, etc.

The over laminating material is, of necessity, clear and transparent and may have a gloss or matt surface. The associated adhesive for affixing the protective overlaminating layer must be compatible with the previously printed inks and the base layer.

The overlaminate may be applied by several different methods; e.g., (1) hot laminating using an adhesive that melts upon the application of heat; (2) cold laminating using a pressure sensitive adhesive; and (3) solvent based adhesive where the adhesive is applied as a solution and its associated solvent must be driven off prior to bonding. Other methods have also been utilized.

The known methods for manufacturing such decals are costly and time consuming. Also, since the overlaminate applied to the ink and backing layers is continuous, the decals must be die cut from the continuous sheets before final use. This involves the added expense of costly dies and cutting equipment, particularly when the decal has a complex shape.

There are many other different types of labels or decals produced by various processes. One common process requires printing successive layers of inks onto a release coated paper stock and finally applying an adhesive. Such labels are normally printed with nitrocellulose ink systems and do not approach the strength of the laminated decals. Decals of such construction also suffer from another major disadvantage. They are printed onto a paper based substrate and they are printed by screen process. Paper substrates are heavy and generally opaque. Still the heavy substrate is necessary to allow the sheet to be printed with many layers needed to build up the strength of the decal by applying many coats of clear laquer as well as all the colors needed to achieve the graphic design.

The opacity of the substrate makes it impossible to accurately align these decals and place them precisely. Further, when such decals use a high tack adhesives, the adhesive bonds immediately upon contact and no repositioning of the decals is possible. This is particularly true with respect to the printed decals which do not have sufficient tensile strength to allow peeling and replacement.

There are still other labels that have been detailed in various patents such as Reed, U.S. Pat. No. 3,987,225 or Mackenzie, U.S. Pat. No. 3,212,913. Such labels are printed on transparent plastic substrates usually designed for making original artwork rather than being used as a final decoration although such usage is detailed in the patents. Reed and others teach the use of cellulose inks of low film thickness typically 0.003–0.0005 inches and low tack adhesives. However, these decals do not approach the strength and abrasion resistance of the laminated decals previously discussed.

Keough et al in U.S. Pat. No. 4,022,426 discloses a laminated label which is fashioned by printing a radiation polymerizable liquid onto discrete areas of a backing or carrier sheet covered with discrete areas of adhesive. The radiation process is an additional step in the manufacturing process of such decals.

Shadbolt et al in U.S. Pat. No. 4,177,309 discloses lettering sheets comprising a carrier sheet, a printing ink formulated with a resin and an adhesive over layer. However, such sheets have limited abrasion resistance and are single color letters.

The present invention is an improved decal which has improved abrasion resistance, may be printed in multicolors and which may be manufactured by use of printing techniques.

SUMMARY OF THE INVENTION

An object of the present invention is to produce a label that has all of the characteristics of the previously described, laminated labels and which also can be produced by a simple printing process that does not require a die-cutting step or radiation treatment.

The proposed label contemplates printing of mutually cross-linkable liquid prepolymers by a screen process on a base sheet. When the prepolymer or carrier layer is subjected to the action of heat or time alone, it cures or crosslinks to form a film of polymer that has characteristics similar to the aforementioned polyester laminating films. By choosing the particular mesh used on the screen and the type of stencil, a wet coating thickness for the carrier layer of up to 0.020 inches can be obtained. Since the prepolymer carrier layer is often close to 100% solids, the cured thickness does not reduce from the deposited thickness and is thus unlike normal solvent based ink systems. Even normal solution inks deposited in very heavy coating weight are very difficult to dry due to the initial surface drying first and trapping of solvent in the main body of the ink layer.

It has further been discovered that certain of these cross-linkable prepolymer carrier combinations when finally cured will release from certain transparent plastic base sheet films thus producing decals that can be seen through the substrate on which they are printed. Accurate positioning is thereby possible.

As previously discussed, other resin systems can be crosslinked from 100% solids in the liquid state by the action of ultraviolet light, see Keough et al, U.S. Pat. No. 4,022,926. These systems require expensive processing steps. For example, high voltage electrical equipment is needed which must be heavily shielded to avoid exposure to the radiation emitted by the curing lamps. The present invention needs no outside influence such as ultraviolet light to complete the cure of the polymer layer.

The specific decal structure of the invention comprises a decal temporarily mounted on a base sheet. The decal is formed by a crosslinked polymeric carrier coat printed in a desired decal pattern on the base sheet. The carrier coat is releasable from the base sheet. Ink layers are subsequently printed on the carrier coat in the desired decal pattern. This is followed by adhesive printing over the decal pattern and positioning a removable protector sheet over the total decal. The decal is applied to a surface by removal of the protector sheet and application to a surface; whereupon the base sheet is removed from the carrier coat leaving the decal in place on the surface.

Thus, it is an object of the invention to provide a decal having a carrier coat or layer comprised of a resin printed on a base sheet which must release from the base sheet at a specific peel bond when cured.

A further object is to provide a carrier layer solution or liquid resin which has a solvent that permits printing and subsequent, relatively quick drying of the carrier layer.

A further object of the invention is that the rate of crosslinking of the carrier layer must be slow enough to give a reasonable life to the carrier layer resin in liquid form in the printing press.

Another object of the invention is to provide a carrier layer resin having a solvent that will not attack and degrade the base film or sheet.

Another object of the invention is to provide a carrier layer resin which, when printed, has a rate of crosslinking such that the layer is at least surface dry or partially crosslinked at the end of the printing cycle to facilitate handling.

Still another object is to provide a carrier layer resin for a decal wherein the crosslinked carrier layer film has a high tensile strength abrasion resistance and is preferably unaffected by solvents, such as alcohol-gasoline, etc.

Another object of the invention is to provide a crosslinked liquid film composition which, when printed, may dry within one to five hours and which is subject to control of drying time by means of catalysts. It is noted that heretofore some self-drying lacquers or resins having low solids formulations so as to promote spray characteristics have been disclosed, see Leverkusen et al, U.S. Pat. No. 2,904,532 issued Sept. 15, 1959. However, self-drying resins having high solids formulations and used in printing and for forming a decal were not known.

These and other objects, advantages and features will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
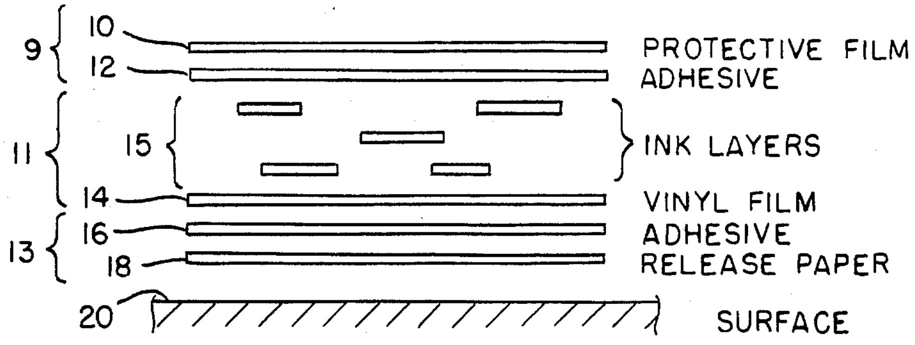
FIG. 1 (PRIOR ART)
FIG. 1 is a diagramatic view illustrating the layers of formation of a typical prior art dry transfer decal.

Referring first to FIG. 1, a typical prior art laminated decal is illustrated in an exploded diagramatic view. The decal is formed by an assembly of laminations. Thus, a first lamination 9 comprises a protective film 10, which is usually transparent, and a layer of adhesive 12. This protective film 10 and adhesive 12 laminate 9 is printed with a second laminate 11 comprising a film 14 upon which a series of ink layers 15 are printed. The ink layers 15 form the decal pattern. A third laminate 13 including an adhesive layer 16 and release paper 18 is affixed to the second laminate 11.

Once the laminates 9, 11, 13 are assembled as shown in FIG. 1, a die is used to cut or form the shape of the decal as defined by the ink pattern. This die cut, shaped decal may then be applied to a surface 20 by removal of the release paper 18 and attachment of the decal to the surface 20 by means of the adhesive 16.

The present invention eliminates the need for the multiple laminates of film and adhesive. It also eliminates the need for die cutting a decal pattern from an ultimately formed laminated decal product as shown in FIG. 1.

Figure 2:
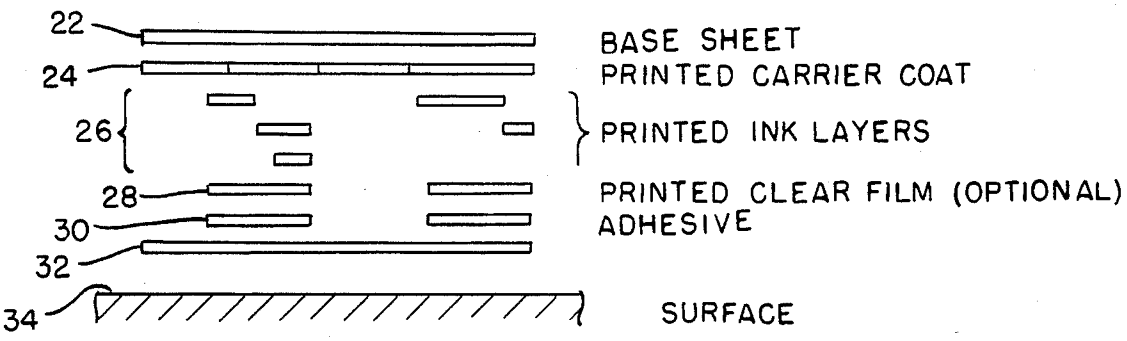
FIG. 2 is a side perspective view or diagramatic view of the improved dry transfer decal of the present invention.

Referring therefore to FIG. 2, there is depicted in a diagramatic view the improved decal of the present invention. The decal is temporarily maintained on a base sheet 22. Sheet 22 may be clear, translucent or opaque.

A carrier coat is printed upon the base sheet 22. The carrier coat 24 is comprised of a polymeric, cross linked resin material having a high solids content. The printed carrier coat 24 is formed or printed on the base sheet 22 in the particular pattern or outline of the decal. Coat 24 is formed as a layer of predetermined thickness having excellent structural integrity to thereby define the shape of the decal itself on the base sheet. Typically the thickness of layer 24 when dry is 0.005 to 0.020 inches. The printed carrier coat 24 will have a smooth or matt finish depending upon the surface characteristics of the base sheet 22. The printed carrier layer 24 thus duplicates the surface of the base sheet 22.

One or more printed ink layers 26 are overprinted on the pattern formed by the carrier coat 24. Note that the carrier coat 24 defines the total outline of the decal. The printed ink layers 26 vary in color and shape to fill the pattern formed by the carrier coat 24. One ink layer or multiple ink layer will thus form the visual pattern which will be seen through the transparent carrier coat 24.

A second printed clear resin film or layer 28 may optionally be printed over the ink layers 26. The second printed layer 28 is preferably printed from the same material as the printed carrier coat 24 and also coincides or duplicates the pattern of the carrier coat 24. Thus, layer 28 is a cross linked polymeric material having a high solids content.

Next, an adhesive 30, preferably a high tack adhesive, is printed directly on the ink layers 26 or over the printed clear film 28 as the case may be. Again, note that the adhesive 30, the printed film 28, and the carrier coat 24 all define the ultimate outline of the decal thus eliminating the need for die cutting or otherwise forming the decal. The decal is in effect formed by a printing operation.

Finally, a protector sheet 32 may be positioned over the adhesive 30. The protector sheet 32 is releasable from the adhesive 30 so that the formed decal of FIG. 2 may ultimately be applied to a surface 34.

Figure 3:
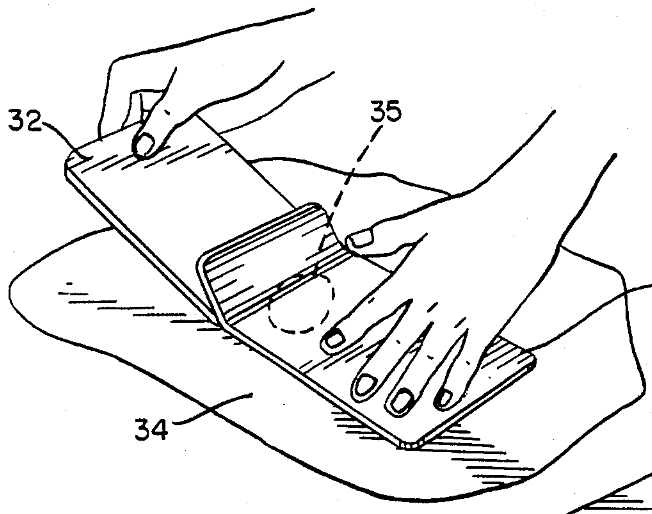
FIG. 3 is a perspective view of the manner by which a decal is applied to a surface.
Figure 4:
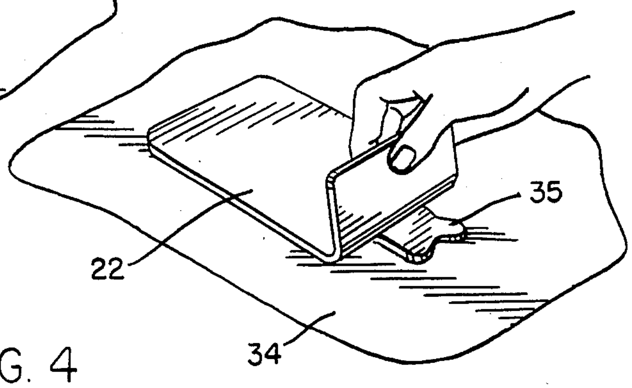
FIG. 4 is a perspective view similar to FIG. 3 wherein the cover sheet for a decal is removed to reveal the decal applied to a surface.

The manner of application of a decal of the type shown in FIG. 2 to a surface 34 is illustrated in greater detail in FIGS. 3 and 4. Referring to FIGS. 3 and 4, it will be noted that the protector sheet 32 is removed first. Decal 35 is then positioned so that the adhesive layer 30, namely the high tack adhesive 30, is applied directly to surface 34. Upon application thereof to the surface 34, it is possible to remove or release the base sheet 22 from the printed carrier coat 24. Thus, the base sheet 22 is separated from the decal 35 and the decal 35 is retained by adhesive layer 30 on surface 34. The outer resin layer 24 serves to protect the decal from abrasion and the like.

It will be noted that the base sheet 22 can generally be described as a polymeric material. Preferably, the base sheet 22 is a clear transparent material although it is not necessary for it to be transparent in order for the invention to provide the desired results. The base sheet is preferably made from a polymeric material such as polyethylene, polystyrene, polypropolene, polyester and mixtures thereof as well as similar transparent or semi-transparent materials.

The carrier coat 24 is generally described as a cross linked polymeric material or resin that will release under controlled conditions from the base sheet 22 and which has a high solids content, preferably 80–100% solids. A high solids content is desired so as to maintain the printed thickness of the film after the solvent has evaporated from the printed film. The carrier sheet 24 may have a matt finish or a smooth finish depending upon the ultimate desired characteristic of the outside surface of the decal. Importantly the thickness of printing during the printing operation with such materials should be sufficient to provide structural integrity to the decal. It has been found that the necessary thickness is in the range of 0.005 to 0.020 inches and preferably at least 0.015 inches.

The carrier coat 24 can be formed from such cross linkable systems as the following: epoxy polyester compounds, epoxy polyamides, polyisocianate/polyester mixtures, polyisocianate/polyol mixtures, urethane/acrylic mixtures and other high solid content liquid prepolymer systems. Though the printed carrier coat 24 may be opaque or transparent, it is also possible to render the material with a pigment in order to give it color.

Each resin layer 24, 28 is printed from the same or similar formulations. Thus, as stated heretofore, the resin layers are preferably formulated from two cross linkable polymeric components hereinafter designated as component A and component B. Preferred component A and component B constituents are identified as follows:

Component A: Polymethyl polyphenyl isocyanates, aromatic and aliphate polyisocyanate prepolymers, toluene diisocyanate based aducts, copolymers of aromatic and aliphatic polyisocyanates, toluene polyisocyanurate, polyfunctional aliphatic isocyanates, blocked isocyanate prepolymers, 2, 4 toluene diisocyanates, prepolymers of diphenyl methane diisocyanates, epoxy or oxirane resins.

Component B: Hydroxyl terminated castor oils, hydroxyl terminated linear and branched polyesters, acrylic resins and reactive polyamides (such as those based on dimerized fatty acids and polyamines).

In the preferred embodiments one constituent from the list of component A is mixed with one constituent from the list of component B and an organic compound solvent such as a cellulose acetate butyrate solution or a nitrocellulose solution along with optional additional constituents such as catalysts and/or silicone oil. Component A preferably comprises a major constituent of the formulation in the range of 80 to 120 parts. Component B comprises 40-80 parts of the formulation. The solvent comprises about 5-20 parts and the remaining constituents are generally less than 5 parts. The solids content of the major reactants is preferably in the range of 60–100% so that the final formulation will have a solids range of 78–90%.

Each layer 24, 28 may be formulated independently to accentuate desired characteristics. Thus, layer 24 may be formulated for improved abrasion resistance and release from sheet 22. Layer 28 may be formulated for optimum strength and toughness.

The layers 24, 28 and ink layers 26 are preferably printed by a silk screen printing process. In this process a photographically produced negative resist is formed as an integral part of a fine polyester mesh held rigidly stretched in a metal frame. Ink is forced through the positive or open part of the mesh by the passage, either manually or mechanically, of a rubber squeegee across the mesh. Placing a sheet of material under the mesh or stencil results in an image formed on the material in the same shape as the positive of the stencil.

Sheets so printed are commonly placed in a continuous wicket or driver. This is a mechanical device that can support several hundred sheets so that the wet coatings can dry without coming into contact with any other surface or support without disturbance. Heat can be applied in the drier to aid solvent removal or induce cross linking. The use of such a drier that will hold a thousand printed sheets will allow two or more hours for ink to dry or crosslink so that on being removed from the wicket the sheets can be stacked in a normal manner.

An automatic system with a fast feeding system and a wicket driver held at 120° F. was used to produce Examples 1 and 2. In these cases the carrier layers 24, 28 by the use of a suitable catalyst were dry enough to stack at the end of a two hour cycle.

The ink layers which form the graphic design of the decal may be of any ink which is compatible with the carrier coat 24. Typical inks which may be utilized with this material are the following: inks based on nitrocellulose, cellulose acetate butyrate, ethyl hydroxy ethyl cellulose, propyl cellulose, ethyl cellulose or inks based on natural drying oil such as linseed tung or boiled oil.

The inks may be printed in a pattern for direct application of the decal and viewing on an opaque surface or for application to and viewing through a transparent material. This requires printing of sections in proper register or overprinting in a proper sequence depending upon the application.

The adhesive which is used as adhesive layer 30 is preferably a high tack adhesive. Typical of such adhesives are the following: those based on synthetic rubber, acrylics, polyvinyl ethers natural rubber. Normally such adhesives contain resins to give the preferred tack level. All adhesives used in this application can be emulsion or solvent based. Tack levels greater than 200 gms./inch are preferred.

Following are two examples of specific formulations for the various sheets and carrier coats and printed ink layers used to form the decal of the present invention:

EXAMPLE 1

Onto a base film of 0.005" pure transparent polystyrene film as a base or carrier sheet 22, a clear layer 24 of the following composition was screen printed through a polyester mesh of 100 threads per inch with a high coating weight stencil with a wet thickness of 0.018 inches to give a dry cured coating thickness of 0.015 inches:

| | | Parts Range of Film Constituents |
|---|---|---|
| 100 parts | Aliphatic toluene di isocyonate (75% solids) eg. Mondur CB 75 from Mobay Chemical Company | 80–120 |
| 65 parts | clear 100% solids castor derived polyol with a high hydroxyl value, eg. Polyol 1066 from Spencer Kellog Company | 40–80 |
| 10 parts | 25% cellulose acetate butyrate in butyl cellosolve | 5–20 |
| 1.5 parts | silicone oil N200 viscosity | 5–6 |
| .01 parts | catalyst - tertiary amine<br>solids content - 81%<br>Viscosity - 20 stokes | |

The printed layer 24 was allowed to dry in air for 24 hours. Use of catalysts in the resin formulation reduces the drying time to one to five hours as desired.

Over this film layer was printed in a suitable standard ink system various layers of different colored inks by screen process to form the desired graphics.

After the graphics were printed, a high tack pressure sensitive adhesive was printed slightly oversize to the clear carrier layer 24. This adhesive had the following composition:

| | |
|---|---|
| 9.54 parts | High molecular weight polyvinyl ethyl ether |
| 15.00 parts | polymerised α pinene |
| 3.00 parts | dihydroabietyl phthalate |
| 1.375 parts | finely dispersed silica |
| 7.50 parts | aromatic solvent<br>(eg. Solvesso 150 by Esso Corp.) |

To the above decal was applied a protective sheet 32 of Kraft glassine coated with a polysiloxane polymer release coating to protect the decal and allow it to be handled.

The release characteristics of the decal, i.e., layer 24, to the base sheet 22 (the polystyrene) were such that the measured peel was of the order of 100 grams per inch. The force needed to break the decal from its base sheet 22 was of the order of 3000 grams per inch. On application of the decal, pressure applied to one edge causes the overlapping adhesive to shear allowing the decal to be applied as required. The cured decal has an elongation of 17–23% and a tensile strength of 800 grams per inch.

EXAMPLE 2

Onto a base 22 of 0.010 polyethylene film a clear layer 24 of the following resin composition was applied through a 140 polyester mesh screen in a wet thickness of 0.013 inches to give a cured coating thickness of 0.010 inches.

| | | Parts Range of Film Constituents |
|---|---|---|
| 70 parts | aromatic polyurethane with 7.5% available NCO 75% solids | 60–80 |
| 30 parts | hydroxyl terminated polyester with 1.3% available OH, 100% solids | 15–45 |
| 5 parts | 30% nitrocellulose solution | 1–10 |
| .01 parts | catalyst<br>Solids content - 80%<br>Viscosity - 25 stokes | |

After the clear coat 24 had cured for 24 hours by air drying, the subsequent layers 26 of inks needed to complete the graphics were printed by screen process. Next, a second coat of the crosslinkable urethane coating 28 was applied in a thickness of 0.015 and allowed to dry for 24 hours in air. Adhesive 30 was applied as in Example 1 and the protective silicone paper 32 applied.

The cured decal after a period of 2 days had an elongation of from 15–20% and a tensile strength of 1000 grams per inch.

While there has been set forth a preferred embodiment of the invention, it is to be understood that the invention is to limited only by the following claims and their equivalents.

What is claimed is:

1. A method of manufacture of an improved pressure sensitive, laminated, dry transfer decal that does not require complex or expensive processing steps comprising the steps of:

printing a carrier coat of cross linked, polymeric material in a range of 0.005 to 0.020 inches thickness and in form and extent of a complete image of a decal on a polymeric base sheet;

subsequently drying the carrier coat to form a dried carrier coat;

printing at least one ink layer on the dried carrier coat within the form and extent of the carrier coat to define a portion of the image;

printing a second coat of cross linked, polymeric material over the printed ink layers, said carrier coat and second coat providing protection for the ink layers to form a combination of layers; and coating the combination of layers with a high tack adhesive over the total form and extent thereof to provide a releasable, pressure sensitive decal on a support backing of a base sheet.

2. The method of claim 1 including the addition of step of positioning a removable protector sheet over the adhesive layer.

3. The method of claim 1 including the step of providing a base sheet between 0.002 and 0.010 inches thick.

* * * * *